United States Patent
Zhang et al.

(10) Patent No.: US 11,638,290 B2
(45) Date of Patent: Apr. 25, 2023

(54) DOWNLINK CONTROL FOR MULTI-TRP TRANSMISSIONS

(71) Applicant: Apple Inc., Cupertino, CA (US)

(72) Inventors: Yushu Zhang, Beijing (CN); Haitong Sun, Irvine, CA (US); Wei Zeng, San Diego, CA (US); Hong He, Cupertino, CA (US); Yuchul Kim, Santa Clara, CA (US); Dawei Zhang, Saratoga, CA (US); Haijing Hu, Beijing (CN); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 17/024,215

(22) Filed: Sep. 17, 2020

(65) Prior Publication Data

US 2021/0100022 A1    Apr. 1, 2021

(30) Foreign Application Priority Data

Sep. 26, 2019 (CN) .......................... 201910917116.4

(51) Int. Cl.
*H04W 72/23* (2023.01)
*H04L 1/00* (2006.01)
*H04W 72/0453* (2023.01)

(52) U.S. Cl.
CPC .......... *H04W 72/23* (2023.01); *H04L 1/0003* (2013.01); *H04W 72/0453* (2013.01)

(58) Field of Classification Search
None
See application file for complete search history.

(56) References Cited

U.S. PATENT DOCUMENTS 10,075,817 B1 *  9/2018  Burugupalli ...... H04W 52/0274
10,880,895 B2 * 12/2020  Gordaychik .......... H04L 1/1896
(Continued)

FOREIGN PATENT DOCUMENTS

| CN | 114175552 A | * | 3/2022 | ........... H04L 1/0025 |
| WO | 2018/231001 A1 | | 12/2018 | |
| WO | 2018/231812 A1 | | 12/2018 | |

OTHER PUBLICATIONS

Translation of CN114175552A, Jul. 2019, pp. 1-19. (Year: 2019).*
(Continued)

*Primary Examiner* — Nicholas Sloms
(74) *Attorney, Agent, or Firm* — Kowert, Hood, Munyon, Rankin & Goetzel, PC

(57) ABSTRACT

Apparatuses, systems, and methods for providing downlink control for multi-TRP transmission. A cellular base station may provide a downlink control information transmission to a wireless device scheduling downlink transmissions to the wireless device from multiple transmission reception points. The downlink control information may include information that can be used by the wireless device to determine any or all of physical resource block bundling sizes, frequency domain resource allocations, modulation and coding schemes, redundancy versions, phase tracking reference signal configurations, and any of various other possible types of configuration information for the downlink transmissions. The wireless device may receive the downlink transmissions from the plurality of transmission reception points in accordance with the downlink control information.

20 Claims, 9 Drawing Sheets

(56) References Cited

U.S. PATENT DOCUMENTS

| | | | |
|---|---|---|---|
| 2012/0188950 A1* | 7/2012 | Luo | H04L 5/0032 370/329 |
| 2012/0307771 A1* | 12/2012 | Yang | H04W 72/044 370/329 |
| 2017/0332359 A1* | 11/2017 | Tsai | H04L 5/0053 |
| 2017/0347354 A1* | 11/2017 | Yang | H04W 72/042 |
| 2018/0227960 A1* | 8/2018 | Belghoul | H04W 88/06 |
| 2018/0242192 A1* | 8/2018 | Zhao | H04W 80/00 |
| 2019/0052406 A1* | 2/2019 | Yang | H04L 1/1896 |
| 2019/0149365 A1* | 5/2019 | Chatterjee | H04L 5/0044 370/329 |
| 2019/0174323 A1* | 6/2019 | Go | H04W 24/10 |
| 2019/0215870 A1* | 7/2019 | Babaei | H04L 5/001 |
| 2019/0222400 A1* | 7/2019 | Bagheri | H04L 5/0082 |
| 2019/0253308 A1* | 8/2019 | Huang | H04W 72/10 |
| 2019/0253986 A1* | 8/2019 | Jeon | H04B 7/0695 |
| 2019/0261217 A1* | 8/2019 | Nammi | H04L 1/1812 |
| 2019/0261405 A1* | 8/2019 | Ang | H04W 72/0446 |
| 2019/0313386 A1* | 10/2019 | Hwang | H04W 72/042 |
| 2019/0320420 A1 | 10/2019 | Zhang et al. | |
| 2020/0021470 A1* | 1/2020 | Sun | H04L 5/0051 |
| 2020/0037248 A1* | 1/2020 | Zhou | H04B 7/022 |
| 2020/0037305 A1 | 1/2020 | Yang et al. | |
| 2020/0146035 A1* | 5/2020 | Kim | H04L 5/0053 |
| 2020/0221432 A1 | 7/2020 | Park et al. | |
| 2020/0228970 A1 | 7/2020 | Noh et al. | |
| 2020/0304259 A1* | 9/2020 | Ihalainen | H04L 5/0048 |
| 2021/0100022 A1* | 4/2021 | Zhang | H04L 1/0003 |
| 2021/0242999 A1* | 8/2021 | Baskaran | H04L 27/2636 |
| 2021/0352501 A1* | 11/2021 | Taherzadeh Boroujeni | H04W 24/08 |
| 2021/0367740 A1* | 11/2021 | Chen | H04L 1/1861 |
| 2022/0256573 A1* | 8/2022 | Frenne | H04W 72/1273 |

OTHER PUBLICATIONS

Partial European Search Report for EP 20197379, dated 2/3/221, 16 pages.

Huawei et al. "Singe PDCCH based multi-TRP/panel transmission" 3GPP TSG RAN WG1 Ad-Hoc Meeting 1901 R1-1900848, Jan. 21, 2019, 7 pages.

Intel Corporation "On multi-TRP/Multi-panel transmission" 3GPP Tsg Ran WG1 Meeting #97 R1-1908653, Aug. 26, 2019, 24 pages.

Apple "Considerations on PDCCH design for NCJT" 3GPP TSG RAN WG1R1-1904982, Apr. 8, 2019, 6 pages.

* cited by examiner

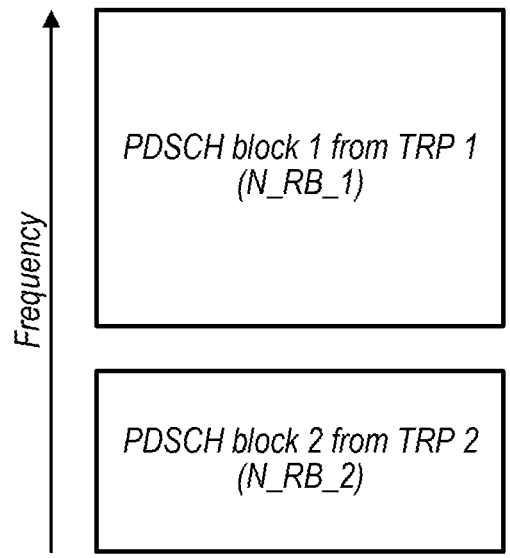
FIG. 12
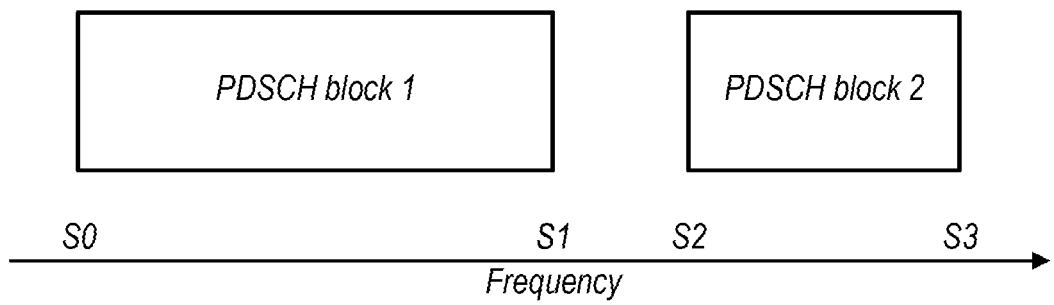
FIG. 13
| Scheduled Bandwidth | Frequency Density ($K_{PT-RS}$) |
|---|---|
| $N_{RB} < N_{RB0}$ | PT-RS is not present |
| $N_{RB0} \leq N_{RB} < N_{RB1}$ | 2 |
| $N_{RB1} \leq N_{RB}$ | 4 |
FIG. 14

DOWNLINK CONTROL FOR MULTI-TRP TRANSMISSIONS

PRIORITY DATA

This application claims benefit of priority to Chinese Application No. 201910917116.4, titled "Downlink Control for Multi-TRP Transmissions", filed Sep. 26, 2019, which is hereby incorporated by reference in its entirety as though fully and completely set forth herein.

FIELD

The present application relates to wireless devices, and more particularly to apparatus, systems, and methods for providing downlink control for multi-TRP transmissions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide downlink control for multi-TRP transmission.

According to the techniques described herein, a cellular base station may provide a downlink control information transmission to a wireless device scheduling downlink transmissions to the wireless device from multiple transmission reception points. The downlink control information may include information that can be used by the wireless device to determine any or all of physical resource block bundling sizes, frequency domain resource allocations, modulation and coding schemes, redundancy versions, phase tracking reference signal configurations, and any of various other possible types of configuration information for the downlink transmissions.

Using the downlink control information, the wireless device may be able to determine the resource allocations and various other configuration details for the downlink transmissions, and thus may be able to receive and decode the downlink transmissions from the plurality of transmission reception points in accordance with the downlink control information.

Thus, the techniques described herein may be used to support a single downlink control information format for scheduling multi-TRP downlink transmissions, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 12-13 illustrate aspects of exemplary possible frequency resource allocations for a FDM multi-TRP communication; and FIG. 14 is an example of a table that can be used to map a scheduled bandwidth to a PT-RS frequency density for a downlink communication, according to some embodiments.

Figure 1:
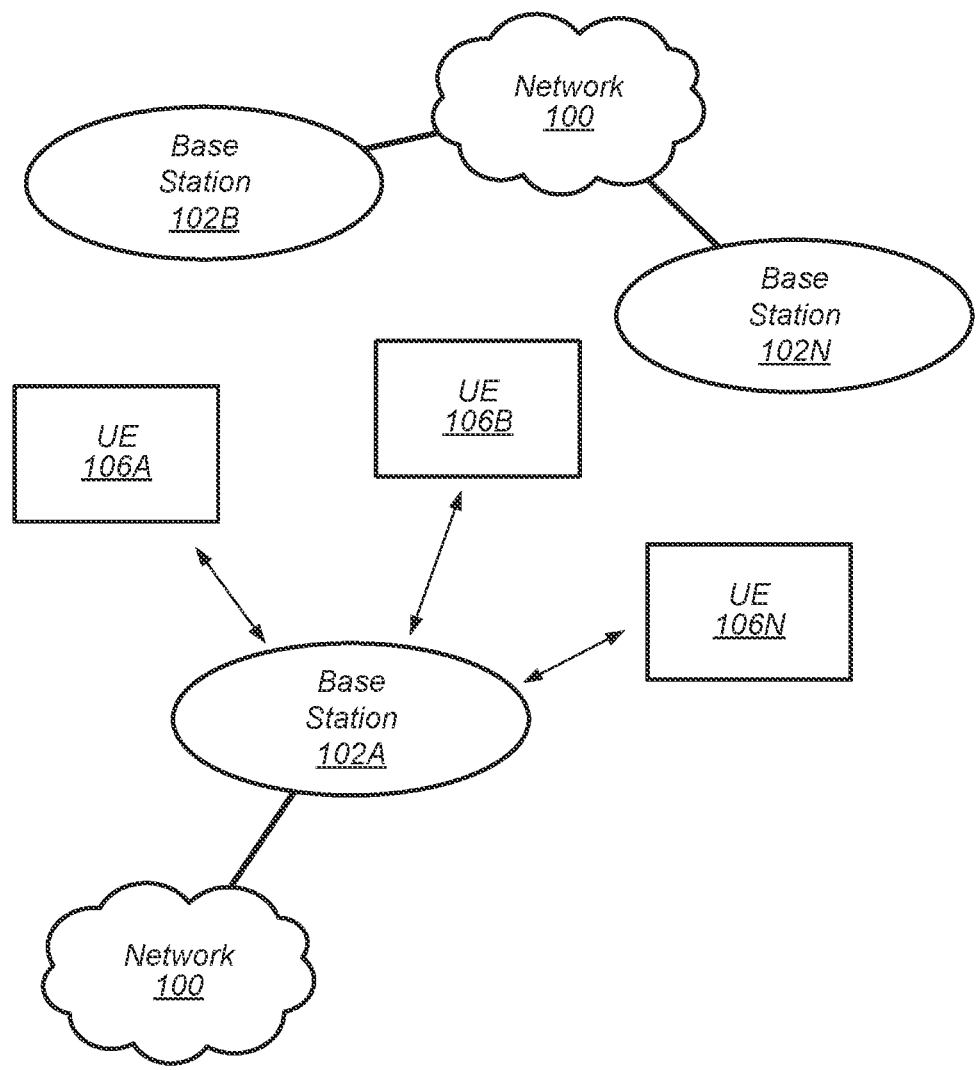
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
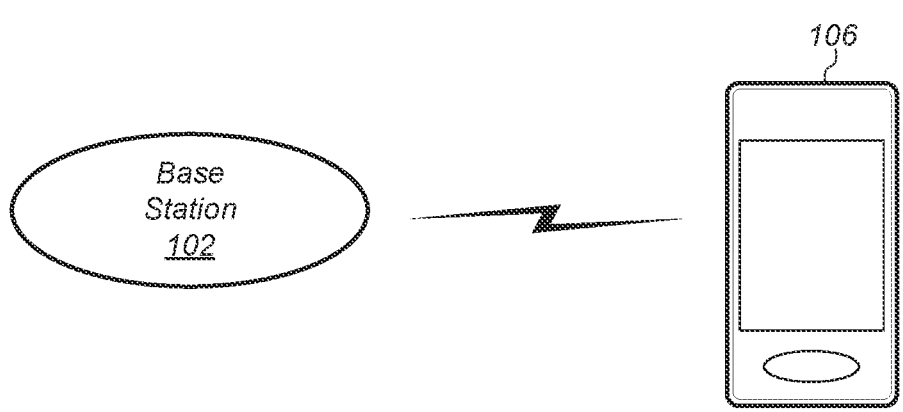
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
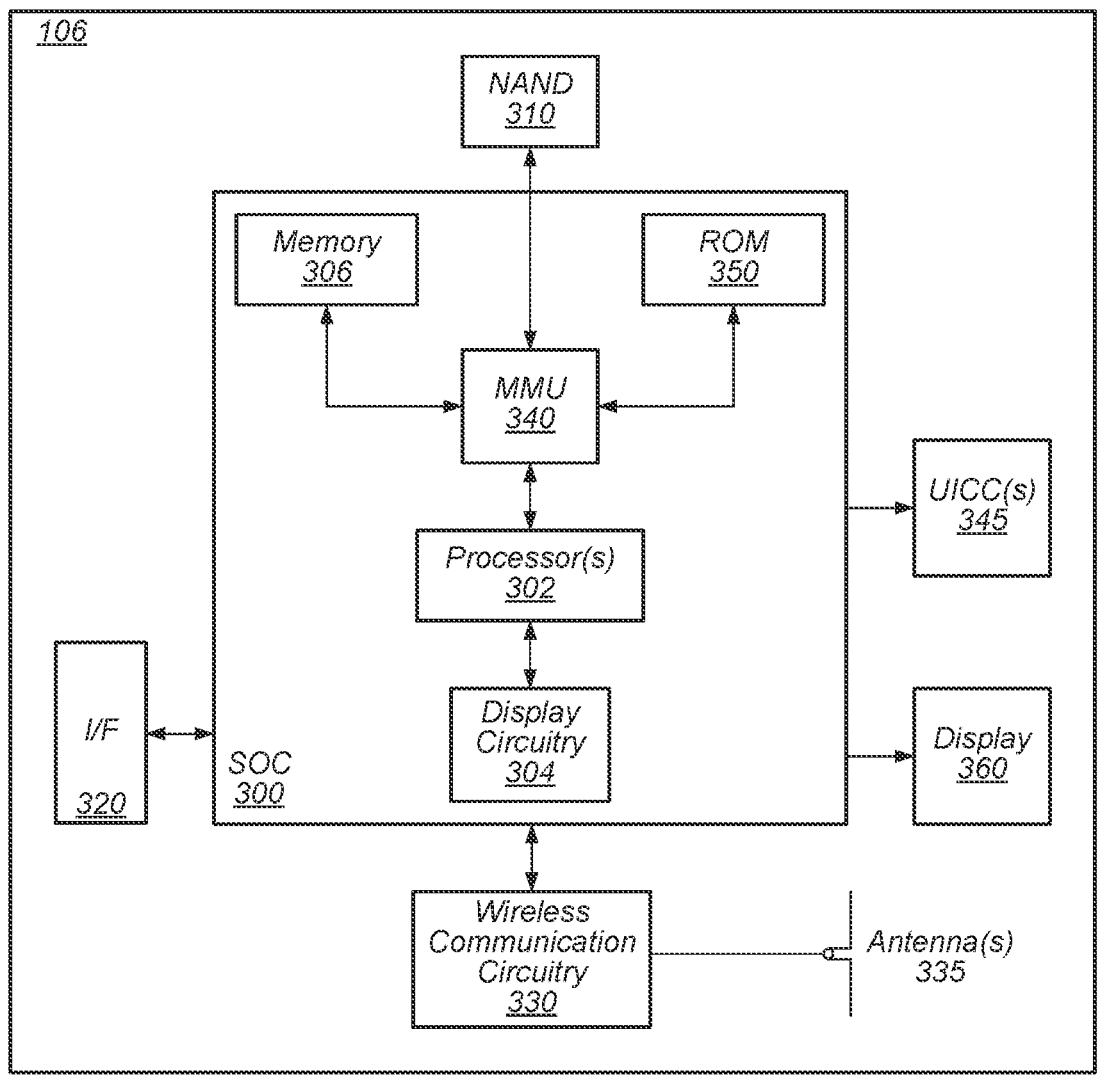
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
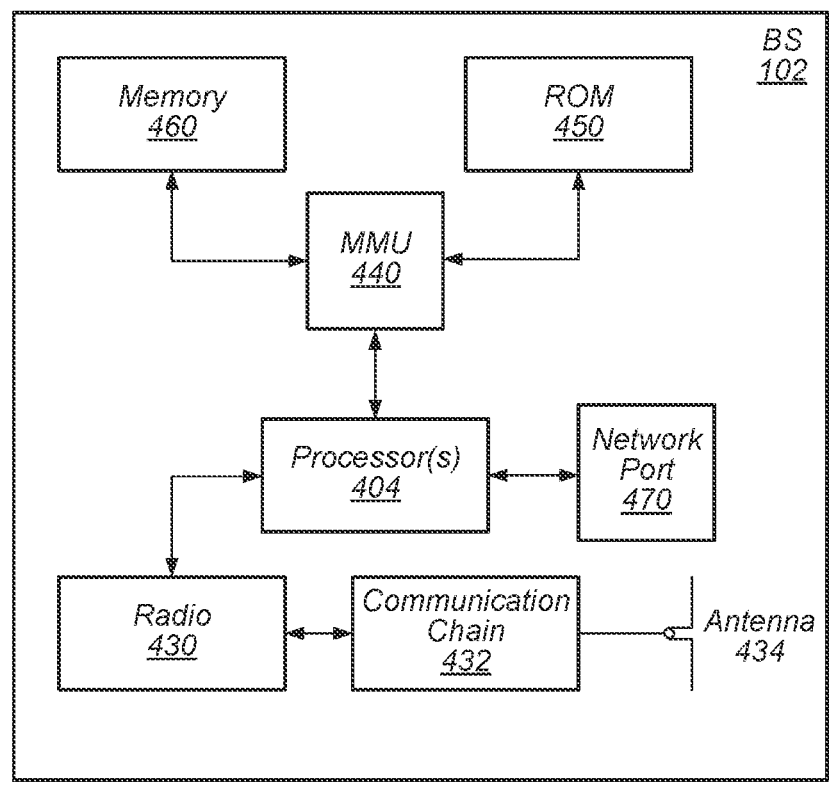
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
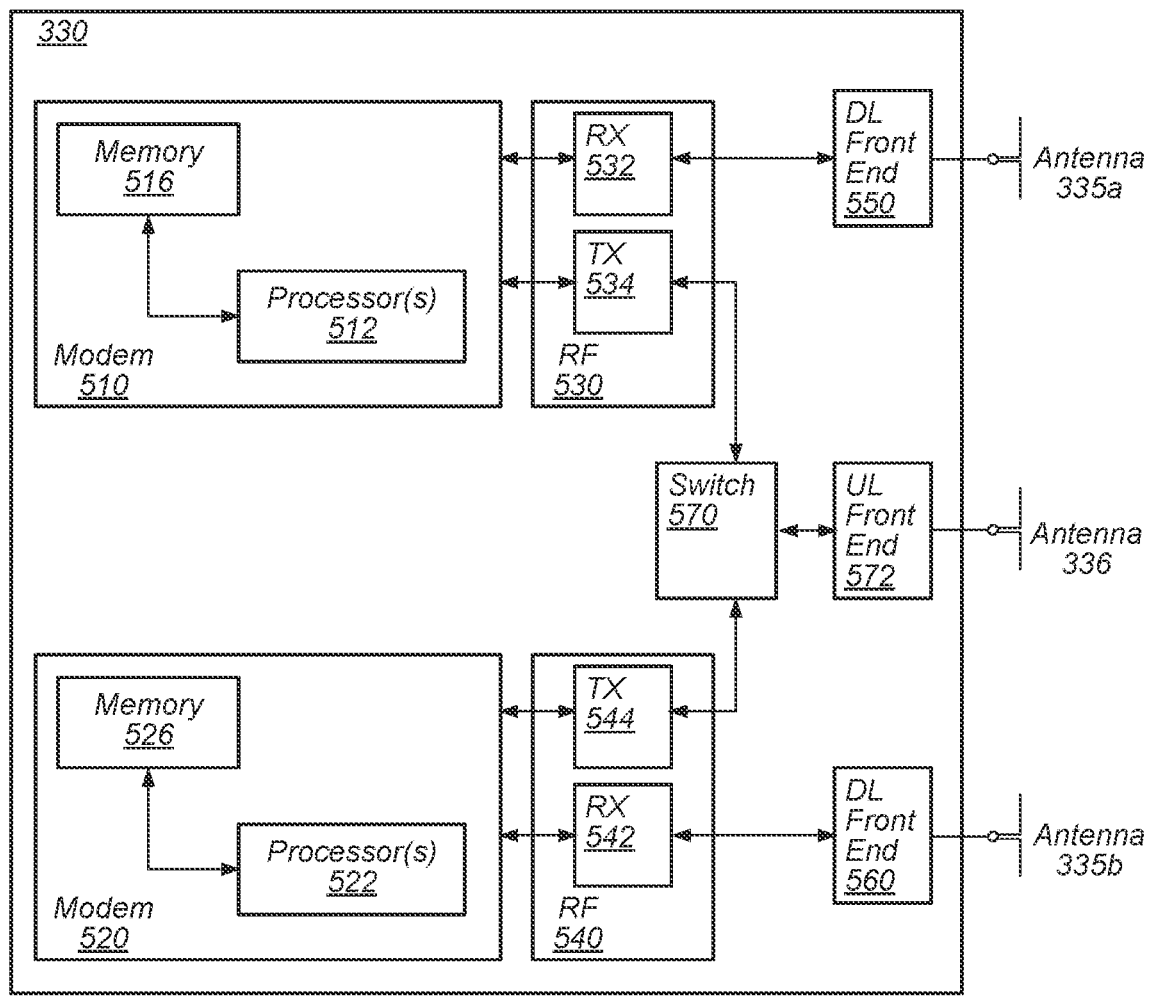
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
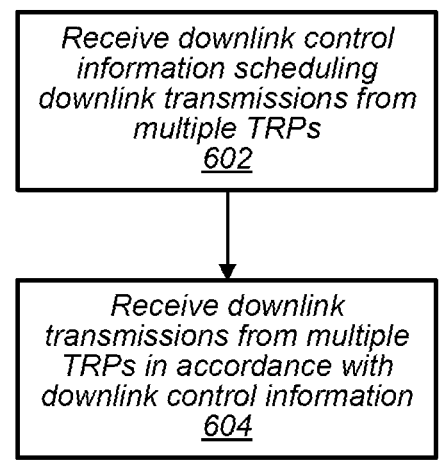
FIG. 6 is a flowchart diagram illustrating an example method for providing downlink control information scheduling downlink transmissions from multiple transmission reception points (TRPs), according to some embodiments.

FIG. 6—Downlink Control for Multi-TRP Transmission

New cellular communication techniques are continually under development, to increase coverage, to better serve the range of demands and use cases, and for a variety of other reasons. One technique that is currently under development may include scheduling transmissions in which multiple TRPs can transmit downlink data to a wireless device. As part of such development, it would be useful to provide a downlink control framework that can support such a technique.

Accordingly, FIG. 6 is a signal flow diagram illustrating an example of such a method, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, a wireless device may receive downlink control information (DCI) for a multi-TRP transmission. The DCI may be provided in any of a variety of possible formats. At least according to some embodiments, the wireless device may receive an indication of which of multiple possible formats is being used to provide the DCI. For example, such information may be broadcast by a base station to which the wireless device is attached in a system information broadcast, among various other possibilities.

As one possible format, the DCI may be provided as a single DCI transmission from a cellular base station that includes scheduling information for multiple downlink data streams. The cellular base station may provide all of the multiple TRPs from which the downlink transmissions are scheduled, or may provide only a subset of the multiple TRPs from which the downlink transmissions are scheduled, while one or more of the TRPs from which the downlink transmissions are scheduled could be provided by one or more other cellular base stations, according to some embodiments.

In case of a single DCI transmission being used to schedule the multi-TRP transmission, the DCI may include entirely separate/independent scheduling information for each downlink data stream, or may include some scheduling information that is common to the downlink data streams and some scheduling information that is separate/independent for each of the downlink data streams, e.g., to more efficiently communicate the scheduling information.

According to some embodiments, the downlink transmissions may include physical downlink shared channel (PDSCH) blocks that are provided by the multiple TRPs using frequency division multiplexing techniques, e.g., such that the different PDSCH blocks have different frequency resource allocations, which may each include a certain number of resource blocks (RBs), which may in turn be bundled according to any of multiple possible physical RB (PRB) bundling sizes.

In such a scenario, it may be the case that the DCI includes information that can be used by the wireless device to determine (PRB) bundling sizes for the downlink transmissions. For example, it may be the case that different PRB bundling sizes could be configured for the downlink transmissions from the different TRPs. In such a case, PRB bundling related parameters could be indicated for each downlink transmission. The wireless device may thus be able to determine PRB bundling sizes separately for the downlink transmissions from the plurality of TRPs scheduled by the DCI transmission, at least as one possibility. As another possibility, the PRB bundling size could be common across all of the downlink transmissions scheduled by the DCI. In such a case, PRB bundling related parameters could be indicated for all of the downlink transmissions commonly, or PRB bundling related parameters could still be indicated for each downlink transmission, and the wireless device could determine the common PRB bundling size using a specified or otherwise predetermined technique based on the indicated PRB bundling size for each downlink transmission, such as by selecting the maximum PRB bundling size among the indicated PRB bundling sizes for the downlink transmissions, or by selecting the minimum PRB bundling size among the indicated PRB bundling sizes for the downlink transmissions.

At least in some instances, the DCI may include information that can be used by the wireless device to determine the frequency domain resource allocations for the downlink transmissions. For example, as one possibility, the DCI may include an indication of the frequency domain resource allocation for each of the downlink transmissions, such that the wireless device may be able to determine the frequency domain resource allocation for each of the downlink transmissions based at least in part on the indication of the frequency domain resource allocation for each of the downlink transmissions. As another possibility, the DCI may include a frequency domain resource allocation indicator that configures frequency resources for all of the downlink transmissions. For example, the frequency domain resource allocation indicator could include a combinatorial index that is calculated based on a start resource block index value and an end resource block index value for each of the downlink transmissions. The calculation could be performed in a predetermined manner such that the resulting combinatorial index could be used by the wireless device to determine the start resource block index value and an end resource block index value for each of the downlink transmissions (and thus the frequency domain resource allocation) for each of the downlink transmissions in turn. Such an approach may result in a lower signaling overhead to indicate the frequency domain resource allocations than would result from including an indication of the frequency domain resource allocation for each of the downlink transmissions, at least according to some embodiments.

According to some embodiments, the DCI may include information that can be used by the wireless device to determine the modulation and coding scheme (MC S) and a redundancy version (RV) for each of the downlink transmissions. For example, as one possibility, the DCI may include an indication of the MCS and the RV for each of the downlink transmissions, such that the wireless device may be able to determine the MCS and the RV for each of the downlink transmissions based at least in part on the indication of the MCS and the RV for each of the downlink transmissions. As another possibility, the DCI may include an indication of a MCS and a RV for a first downlink transmission of the downlink transmissions, and a predetermined or configured approach to determining the MCS and RV for each of the other downlink transmissions may be specified. For example, in some embodiments, a common MCS may be used for all of the downlink transmissions, and one MCS indication may be sufficient to indicate the MCS for each of the downlink transmissions. Similarly, in some embodiments, each downlink transmission may have the same RV, such that one RV indication may be sufficient to indicate the RV for each of the downlink transmissions. As another possibility, it may be possible to determine the RV for each downlink transmission for which the RV is not directly indicated in a predetermined or dynamically configured manner based at least in part on the indicated RV. For example, the RV for a second downlink transmission could be calculated based on the RV for the first transmission according to the formula RV2=(RV1+1) mod 3, as one possibility. The specified technique for determining the RV for each downlink transmission for which the RV is not directly indicated could alternatively or additionally be based at least in part on the resource allocation for the that downlink transmission (e.g., the first PRB index of that downlink transmission), and/or based on any of various other considerations, as desired.

According to some embodiments, the DCI may include information that can be used by the wireless device to determine the phase tracking reference signal (PT-RS) configuration for the downlink transmissions. For example, as one possibility, a common PT-RS pattern may be transmitted in conjunction with all of the downlink transmissions. In such a scenario, the PT-RS frequency domain pattern for the downlink transmissions could be determined based at least in part on the number of resource blocks associated with each of the downlink transmissions. For example, the PT-RS frequency domain presence, density, and pattern could be determined using a table mapping scheduled bandwidth to frequency density of the PT-RS, and the scheduled bandwidth used for the mapping could include the number of resource blocks associated with a specified one of the downlink transmissions (e.g., the number of resource blocks associated with a first downlink transmission, or the number of resource blocks associated with a second downlink transmission, etc.), or could include the minimum number of resource blocks scheduled among the downlink transmissions, or could include the maximum number of resource blocks scheduled among the downlink transmissions, or could include the sum total number of resource blocks scheduled in the downlink transmissions, among various other possibilities.

In a scenario in which a common PT-RS pattern is transmitted in conjunction with all of the downlink transmissions, if the MCS is common for all of the downlink transmissions, it may be the case that the wireless device can determine the PT-RS time domain pattern based on the indicated common MCS. Alternatively, if the different downlink transmissions from the different TRPs have different MCS configurations, the PT-RS time domain pattern could be determined based at least in part on the configured MCS for each of the downlink transmissions. For example, the PT-RS time domain pattern could be selected based on the minimum MCS among the downlink transmissions, or based on the maximum MCS among the downlink transmissions, or based on an equivalent overall MCS determined based on the MCS for each of the downlink transmissions, among various possibilities.

As another possible scenario, separate PT-RS patterns could be used for each downlink transmission. In such a scenario, the wireless device may be able to determine the PT-RS pattern separately for each of the downlink transmissions, e.g., based at least in part on the number of scheduled RBs and the MCS associated with each of the downlink transmissions.

In some embodiments, the downlink transmissions may be providing using spatial division multiplexing techniques. In such a scenario, it may be the case that the DCI indicates a demodulation reference signal (DMRS) port allocation for each of the downlink transmissions, and that the wireless device is able to determine a PT-RS port associated with each of the downlink transmissions based at least in part on the DMRS port allocation. For example, the PT-RS port for a given transmission may be associated with the lowest DMRS port index, as one possibility. As another possibility, the PT-RS port for a given transmission could be associated with the highest DMRS port index for that transmission.

In 604, the wireless device may receive the downlink transmissions from the multiple TRPs in accordance with the DCI. This may include utilizing the various parameters and configuration information provided in and/or determined based on the DCI to receive and decode each of the multiple downlink transmissions.

Thus, the method of FIG. 6 may be used by multiple TRPs and a wireless device to schedule and perform a multi-TRP downlink communication to the wireless device, at least according to some embodiments.

FIGS. 7-16 and Additional Information

FIGS. 7-16 illustrate further aspects that might be used in conjunction with the method of FIG. 6 if desired. It should be noted, however, that the exemplary details illustrated in and described with respect to FIGS. 7-16 are not intended to be limiting to the disclosure as a whole: numerous variations and alternatives to the details provided herein below are possible and should be considered within the scope of the disclosure.

Figure 7:
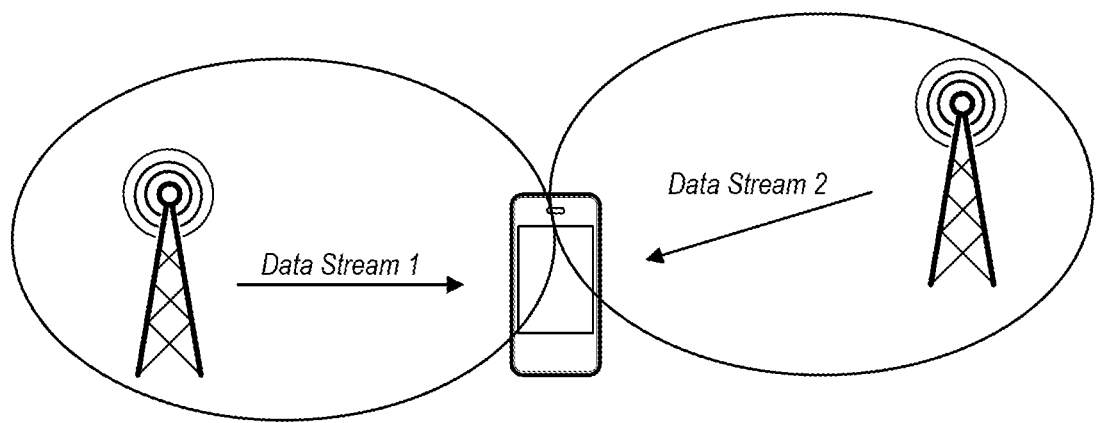
FIG. 7 illustrates an example scenario in which two TRPs schedule two data streams to a wireless device, according to some embodiments.

FIG. 7 illustrates an example scenario in which two transmission reception points (TRPs) schedule two data streams to a wireless device, according to some embodiments. Such multi-TRP operation may include non coherent joint transmission (NCJT) communication, as one possibility. Other forms of multi-TRP operation are also possible.

Figure 8:
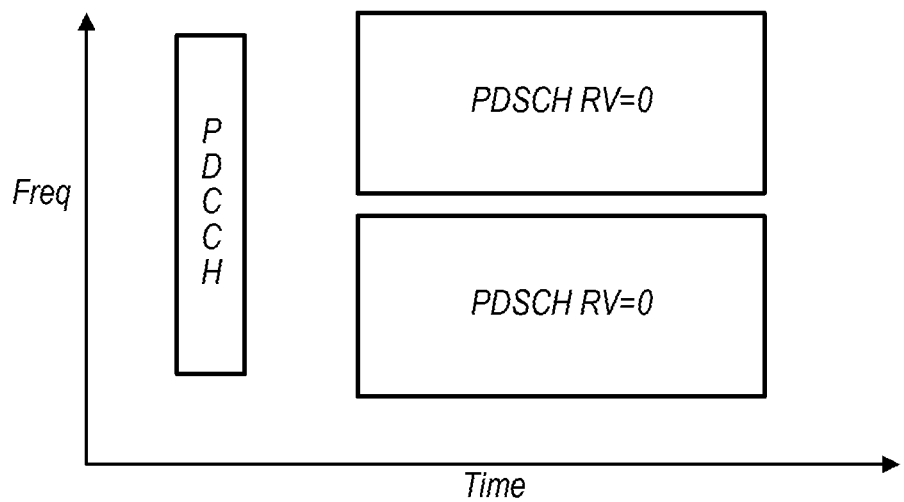
FIGS. 8-9 illustrate aspects of exemplary possible frequency division multiplexing (FDM) schemes for multi-TRP operation, according to some embodiments.
Figure 9:
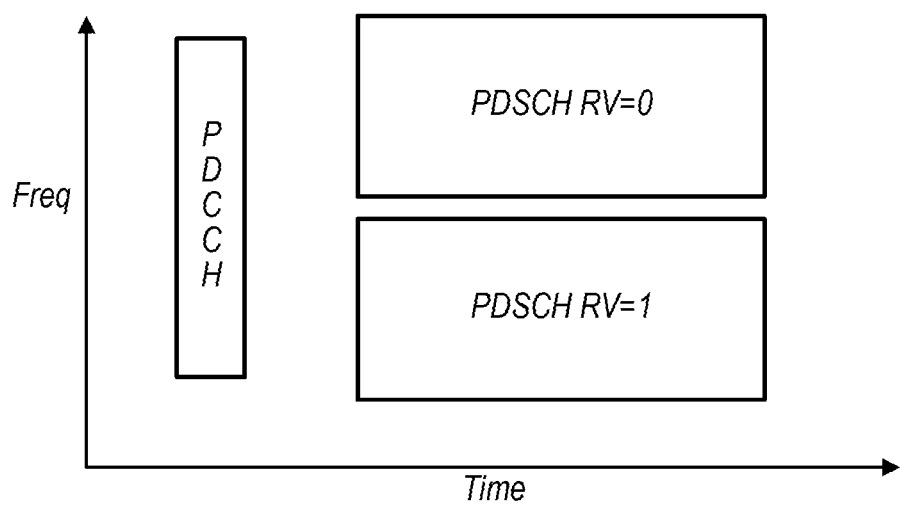

There may be a variety of options for providing a signaling framework for scheduling such multi-TRP operation. As one possibility, a single downlink control information (DCI) communication may be used to schedule different physical downlink control channel (PDSCH) blocks for a UE from different TRPs. The different PDSCH blocks may be provided using a frequency division multiplexing scheme, as one possibility. FIG. 8 illustrates possible time and frequency resource usage in one example of such a scheme, in which the two different PDSCH blocks share the same redundancy version (RV). FIG. 9 illustrates possible time and frequency resource usage in another example of such a scheme, in which the two different PDSCH blocks are allocated different RVs. As a still further possibility, a spatial domain multiplexing (SDM) based approach to providing different PDSCH blocks from different TRPs to a UE may be used. In such a scenario, it may be the case that different demodulation reference signal (DMRS) ports can correspond to different TRPs.

Figure 10:
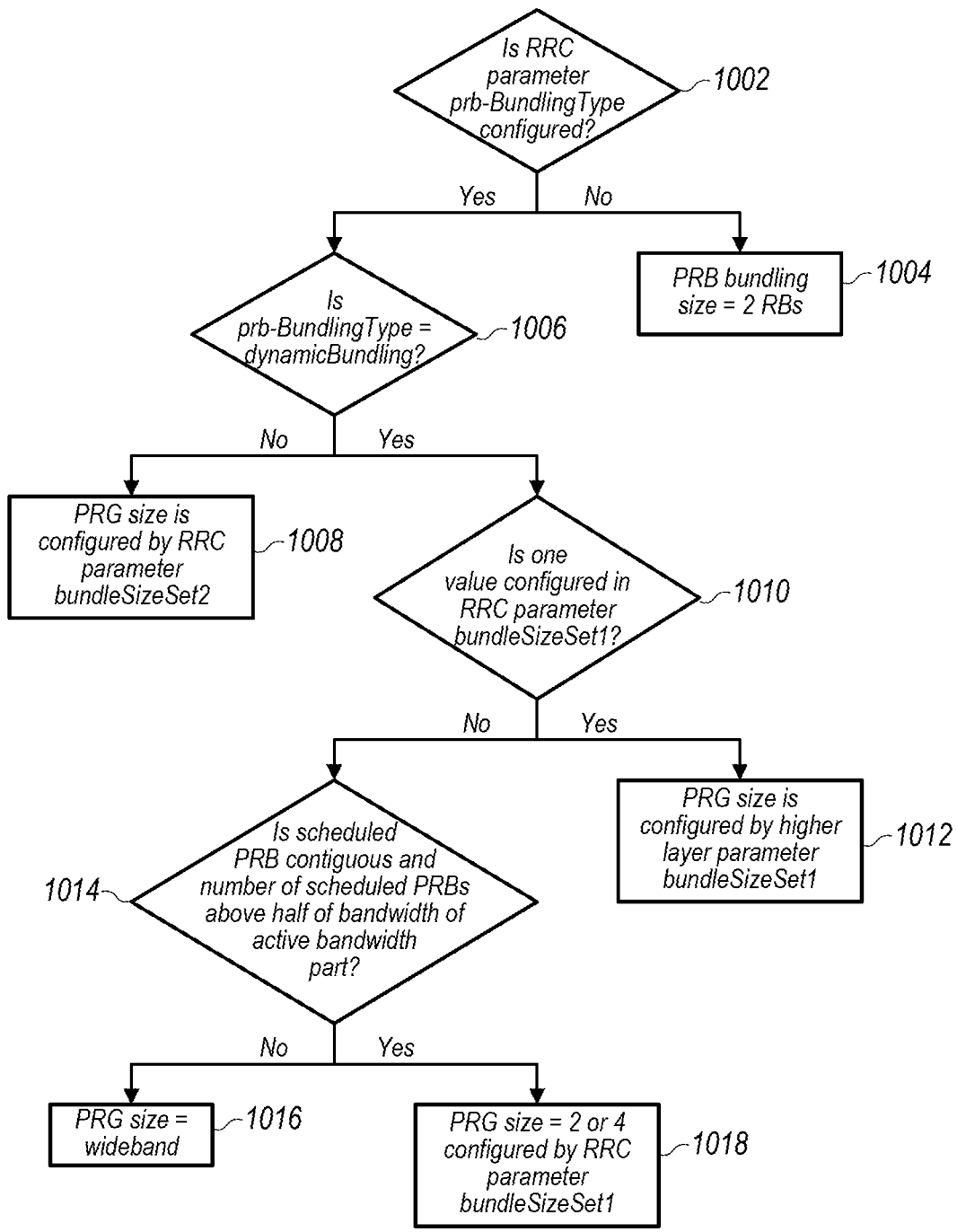
FIGS. 10-11 are flowchart diagrams illustrating example methods for determining PRB bundling sizes.

One aspect of configuring a downlink communication may include indicating (e.g., by the network) and determining (e.g., by the UE) the physical resource block (PRB) bundling size for the downlink communication. FIG. 10 is a flowchart diagram illustrating one possible scheme that may be used by a UE to determine the PRB bundling size for a PDSCH communication, according to some embodiments.

As shown, in 1002, the UE may determine if the RRC parameter prb-BundlingType is configured. In 1004, if it is not, the UE may determine that a default PRB bundling size (e.g., 2 RBs, in the illustrated scenario) is configured. In 1006, if the RRC parameter prb-BundlingType is configured, it may be determined if the prb-BundlingType parameter is set to dynamicBundling. If it is not, in 1008, the UE may determine that the PRB group size is configured by the RRC parameter bundleSizeSet2 (e.g., which may be selected from an enumerated set of PRB bundle size options). In 1010, if the prb-BundlingType parameter is set to dynamicBundling, the UE may further determine if one value is configured in the RRC parameter bundleSizeSet1. If so, in 1012, the UE may determine the PRG size based on the higher layer parameter bundleSizeSet1 (e.g., which may be selected from an enumerated set of PRB bundle size options). If not, in 1014, the UE may determine if the scheduled set of PRBs is contiguous and if the number of scheduled PRBs is above half of the bandwidth of the active bandwidth part. If not, in 1016, the UE may determine that the PRG size is wideband. If so, in 1018, the UE may determine that the PRG size is equal to 2 of 4, e.g., as configured by the RRC parameter bundleSizeSet1.

In a communication framework that utilizes a FDM scheme, it may be the case that physical resource blocks (PRBs) from the different TRPs should not be bundled. Effectively, the channels from the TRPs should be different. Thus, with respect to determining a PRB group bundling size, it may be preferable in such a scenario that a 'wideband' group size should not be indicated, or that a PDSCH block specific definition of a wideband group size should be used. More generally, it may be useful to provide a framework for indicating and determining PRB bundling size such that different PRB bundling sizes can be used for different TRPs. Accordingly, FIG. 11 is a flowchart diagram illustrating another possible scheme, e.g., as an alternative to the method of FIG. 10, that may be used by a UE to determine the PRB bundling size for each PDSCH block of a multi-TRP downlink communication, according to some embodiments.

As shown, in 1102, the UE may determine if the RRC parameter prb-BundlingType is configured for the current PDSCH block. In 1104, if it is not, the UE may determine that a default PRB bundling size (e.g., 2 RBs, in the illustrated scenario) is configured for the current PDSCH block. In 1106, if the the RRC parameter prb-BundlingType is configured, it may be determined if the prb-BundlingType parameter is set to dynamicBundling. If it is not, in 1108, the UE may determine that the PRB group size for the current PDSCH block is configured by the RRC parameter bundle-SizeSet2 (e.g., which may be selected from an enumerated set of PRB bundle size options). In 1110, if the prb-BundlingType parameter is set to dynamicBundling, the UE may further determine if one value is configured in the RRC parameter bundleSizeSet1. If so, in 1112, the UE may determine the PRG size for the current PDSCH block based on the higher layer parameter bundleSizeSet1 (e.g., which may be selected from an enumerated set of PRB bundle size options). If not, in 1114, the UE may determine if the scheduled set of PRBs for the current PDSCH block is contiguous and if the number of scheduled PRBs for the current PDSCH block is above a threshold. If not, in 1116, the UE may determine that the PRG size for the current PDSCH block is wideband. If so, in 1118, the UE may determine that the PRG size for the current PDSCH block is equal to 2 of 4, e.g., as configured by the RRC parameter bundleSizeSet1.

Figure 11:
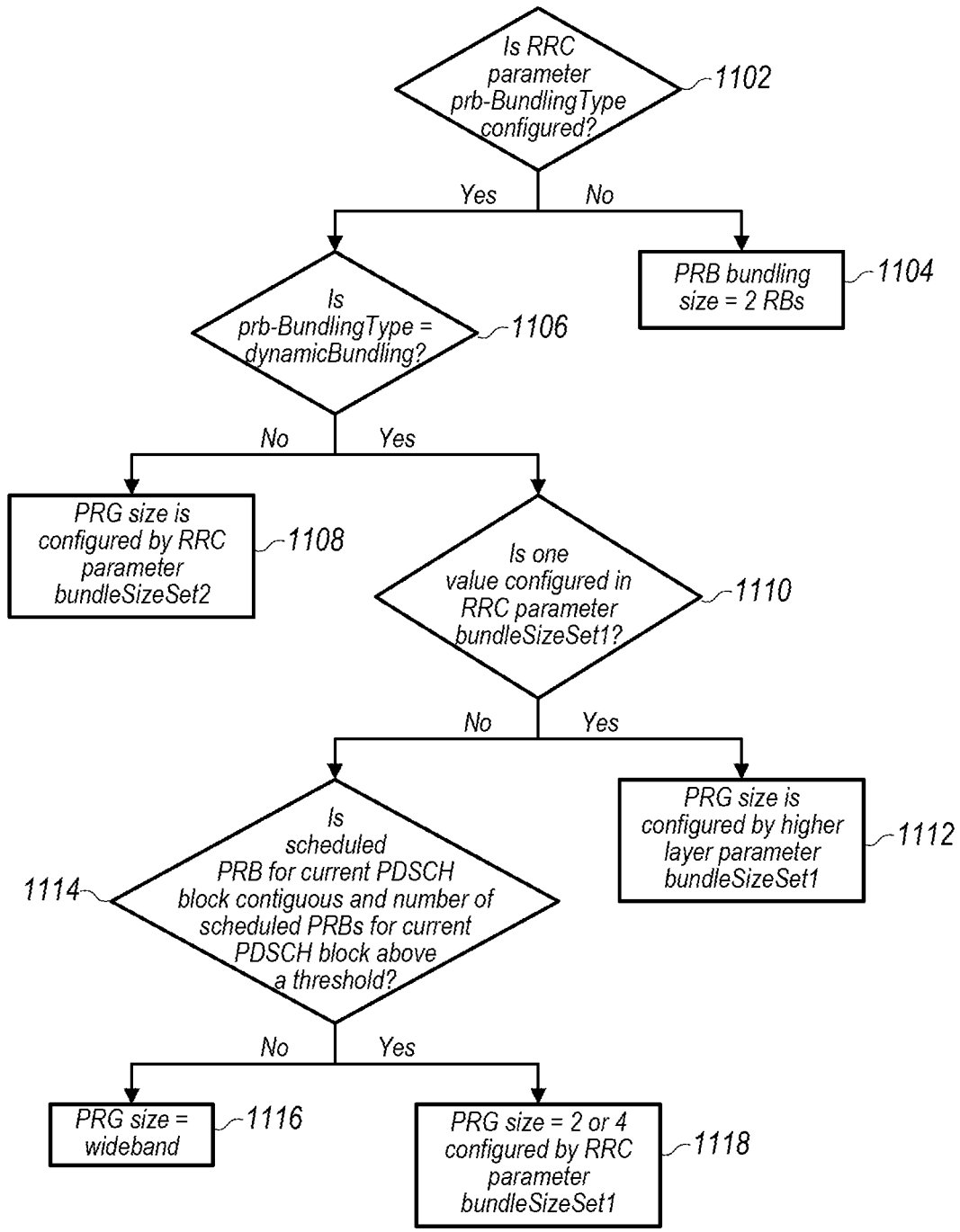

Thus, according to the method of FIG. 11, the PRB bundling size can be determined by the scheduled RBs within each PDSCH block. In this scenario, 'wideband' may indicate that the PRB bundling is at a wideband level within a PDSCH block (e.g., and not necessarily across the entire multi-TRP downlink communication). For dynamic PRB bundling size selection, the 'scheduled set of PRBs' may refer to the number of RBs for the corresponding PDSCH block. The relevant RRC parameters could thus be configured on a per-PDSCH block basis, and the threshold used in step 1114 could be configured by the network using RRC signaling, or could be predefined (e.g., as half of the maximum bandwidth of the active bandwidth part, as one possibility), among various options.

Using such an approach to determine a PRB bundling size separately for each PDSCH block from a different TRP, it may be possible that the PRB bundling size for each PDSCH block is different, e.g., as determined in accordance with the method of FIG. 11, or using an alternative approach. Alternatively, if desired, the UE may determine a common PRB bundling size across all PDSCH blocks, e.g., after separately determining the (e.g., preliminary) PRB bundling size for each PDSCH block. For example, the common PRB bundling size could be determined as the maximum determined PRB bundling size among the configured PDSCH blocks (e.g., max (P1, P2, . . . , $P_j$), where $P_j$ indicates the determined PRB bundling size for the PDSCH block j). As another possibility, the common PRB bundling size could be determined as the minimum determined PRB bundling size among the configured PDSCH blocks (e.g., min (P1, P2, . . . , $P_j$).

Another potentially important aspect of configuring a FDM multi-TRP communication using a single DCI may include providing a mechanism for the UE to identify the frequency domain resource allocation for each PDSCH block. For example, FIG. 12 illustrates an exemplary possible frequency resource allocation for a FDM multi-TRP communication, in which a first PDSCH block from a first TRP may be allocated a first set of RBs (N_RB_1), while a second PDSCH block from a second TRP may be allocated a second set of RBs (N_RB_2).

As one possibility, a gNB providing DCI for a FDM multi-TRP communication may indicate two separate frequency domain resource allocations in the DCI, such that each frequency domain resource allocation indication corresponds to each PDSCH block.

As another possibility, a gNB providing DCI for a FDM multi-TRP communication may use a single frequency domain resource allocation indicator to configure the frequency resources for all of the PDSCH blocks in the DCI. Such a frequency domain resource allocation indicator could be defined in such a way as to specify the starting RB or RBG index and end RB or RBG index of each PDSCH block with a single indicator, for example using a combinatorial index. For example, FIG. 13 illustrates a scenario in which a first PDSCH block ("PDSCH block 1") starts at RB S0 and ends at RB S1, while a second PDSCH block ("PDSCH block 2") starts at RB S2 and ends at RB S3. Using such parameters, the value of the resource allocation field could be determined by a combinatorial index r that may be defined as follows:

$$r = \sum_{i=0}^{M-1} \binom{N - s_i}{M - i}$$

where N is equal to the maximum number of RBs or RBGs within the active bandwidth part, and M is equal to 4. Note that different combinatorial indices and/or different parameters could be used in conjunction with multi-TRP communications that include a different number (e.g., 3, 4, etc.) of PDSCH blocks.

Still another possible aspect of configuring a FDM multi-TRP communication using a single DCI may include providing a mechanism for the UE to determine the modulation and coding scheme (MCS) and RV for different PDSCH blocks. As one possible approach, the existing MCS/RV field for a second transport block may be used to configure a second PDSCH block. For example, 3GPP specification documents could include any or all of the following description (or similar description) regarding specifying the MCS/RV for multiple PDSCH blocks from different TRPs:

For transport block 1 or the PDSCH block corresponding to the first TCI state:
  Modulation and coding scheme—5 bits
  New data indicator—1 bit
  Redundance version—2 bits
For transport block 2 or the PDSCH block corresponding to the second TCI state (only present if maxNrofCodeWordsScheduledByDCI equals 2 or when the second TCI state is indicated):
  Modulation and coding scheme—5 bits
  New data indicator—1 bit
  Redundance version—2 bits As another possible approach, one MCS field may be used to indicate a common MCS for all PDSCH blocks, and only one RV indication (e.g., to indicate the RV for the first PDSCH block) may be provided. In this case, the RV for the second PDSCH block may be determined by the UE based at least in part on the RV for the first PDSCH block. For example, a specified relation between the RV for the first PDSCH block and the RV for the second PDSCH block may be used, such as RV2=(RV1+1) mod 3. If desired, the RV for the second PDSCH block may be determined based on the RV for the first PDSCH block as well as the resource allocation for the second PDSCH block, for example using the first PRB index for the second PDSCH block, or any of various other means may be used to specify a relation between the RV for the first PDSCH block and the RV for the second PDSCH block that allows the UE to determine the RV for each PDSCH block using one RV field of a DCI communication.

A further consideration with respect to configuring a FDM multi-TRP communication using a single DCI may include how to provide a framework that supports a UE dynamically determining the phase tracking reference signal (PT-RS) presence, density, and pattern associated with PDSCH blocks provided by different TRPs. For example, a current approach to determining the PT-RS frequency density for a PDSCH transmission may include using a table that maps scheduled bandwidth with PT-RS frequency density, such as illustrated in FIG. 14. To adapt such an approach to be used in a scenario in which multiple PDSCH blocks provided by different TRPs are provided, it may be important to specify how to determine the PT-RS frequency density for each of the multiple PDSCH blocks.

As one possibility, one common PT-RS pattern may be transmitted associated with all of the PDSCH blocks. In such a case, the PT-RS frequency domain pattern may be selected based at least in part on any or all of: the number of resource blocks for one of the PDSCH blocks (e.g., one of N_RB_1, N_RB_2, . . . ); the minimum number of resource blocks among the PDSCH blocks (e.g., min(N_RB_1, N_RB_2, . . . )); the maximum number of resource blocks among the PDSCH blocks (e.g., max(N_RB_1, N_RB_2, . . . )); the total number of resource blocks among the PDSCH blocks (e.g., N_RB_1+N_RB_2+ . . . ); or in any of various other ways. Additionally, in such a case, the PT-RS time domain patter may be selected based at least in part on the MCS(s) for the PDSCH blocks. For example, if the MCS is common across all PDSCH blocks, the PT-RS time domain pattern may be determined based using the indicated MCS. Otherwise, the PT-RS time domain pattern may be selected based on the minimum MCS among the PDSCH blocks (e.g., min(MCS_1, MCS_2, . . . )), the maximum MCS among the PDSCH blocks (e.g., max (MCS_1, MCS_2, . . . )), an equivalent MCS based on a combination of the MCS configurations (e.g., the MCS with spectral efficiency closest to an equivalent spectral efficiency calculated based on each of the MCS configurations), or in any of various other possible ways.

As another possibility, separate PT-RS patterns could be used for each PDSCH block. In such a scenario, the PD-RS dynamic presence and frequency/time domain pattern for each respective PDSCH block could be determined based on the scheduled RBs and MCS configuration for the respective PDSCH block.

For spatial division multiplexed operation, it may be useful to provide a mechanism for associating PT-RS and DMRS, at least according to some embodiments. For example, it may be the case that DMRS port combinations of 1+1, 1+2, 2+1, and 2+2 are supported, e.g., such that each PDSCH block may be associated with 1 or 2 DMRS ports. Since different TRPs could have different phase noise level properties, it may be preferable to map different PT-RS ports to different TRPs. One way to do so may include transmitting one independent PT-RS port associated with each PDSCH block, where the PT-RS port is associated with one DMRS port within each PDSCH block. The association may be specified in any of various possible ways. As one such possibility, the PT-RS port could be associated with the lowest DMRS port index within each PDSCH block. For example, in a scenario in which a UE is configured with a 1+2 DMRS port combination of {0; 1,2}, the first PR-RS port may be associated with DMRS port 0, while the second PT-RS port may be associated with DMRS port 1. Alternative arrangements, such as associating the PT-RS port with the highest DMRS port index within each PDSCH block, or any of various other arrangements, are also possible. The dynamic presence and density of the PT-RS may be determined based on the scheduled RBs and MCS for each PDSCH block, at least according to some embodiments.

In the following further exemplary embodiments are provided.

One set of embodiments may include a wireless device, comprising: at least one antenna; at least one radio coupled to the at least one antenna; and a processor coupled to the at least one radio; wherein the wireless device is configured to: receive a downlink control information transmission scheduling downlink transmissions from a plurality of transmission reception points (TRPs); and receive downlink transmissions from the plurality of TRPs in accordance with the downlink control information transmission.

According to some embodiments, the wireless device is further configured to: determine physical resource block bundling sizes separately for the downlink transmissions from the plurality of TRPs scheduled by the downlink control information transmission.

According to some embodiments, the wireless device is further configured to: determine a common physical resource block bundling size for the downlink transmissions from the plurality of TRPs scheduled by the downlink control information transmission, wherein the common physical resource block bundling size is determined based on one of: a maximum physical resource block bundling size among the downlink transmissions; or a minimum physical resource block bundling size among the downlink transmissions.

According to some embodiments, the downlink control information transmission includes an indication of a frequency domain resource allocation for each of the downlink transmissions, wherein the wireless device is further configured to: determine a frequency domain resource allocation for each of the downlink transmissions based at least in part on the indication of the frequency domain resource allocation for each of the downlink transmissions.

According to some embodiments, the downlink control information transmission includes a frequency domain resource allocation indicator that configures frequency resources for the downlink transmissions, wherein the wireless device is further configured to: determine a frequency domain resource allocation for each of the downlink transmissions based at least in part on the frequency domain resource allocation indicator, wherein the frequency domain resource allocation indicator comprises a combinatorial index calculated based on a start resource block index value and an end resource block index value for each of the downlink transmissions.

According to some embodiments, the downlink control information transmission includes an indication of a modulation and coding scheme (MCS) and a redundancy version (RV) for each of the downlink transmissions, wherein the wireless device is further configured to: determine the MCS and the RV for each of the downlink transmissions based at least in part on the indication of the MCS and the RV for each of the downlink transmissions.

According to some embodiments, the downlink control information transmission includes an indication of a modulation and coding scheme (MCS) and a redundancy version (RV) for a first downlink transmission of the downlink transmissions, wherein the wireless device is further configured to: determine the MCS and the RV for each of the downlink transmissions based at least in part on the indication of the MCS and the RV for the first downlink transmission.

According to some embodiments, the MCS and the RV for a second downlink transmission of the downlink transmissions is determined further based at least in part on a resource allocation for the second downlink transmission.

Another set of embodiments may include a cellular base station, comprising: at least one antenna; at least one radio coupled to the at least one antenna; and a processor coupled to the at least one radio; wherein the cellular base station is configured to: provide downlink control information scheduling downlink transmissions from a plurality of transmission reception points (TRPs) to a wireless device; and provide at least one downlink transmission to the wireless device in accordance with the downlink control information.

According to some embodiments, the downlink control information scheduling the downlink transmissions from the plurality of TRPs comprises information for determining physical resource block bundling sizes for the downlink transmissions.

According to some embodiments, the downlink control information scheduling the downlink transmissions from the plurality of TRPs comprises information for determining a frequency domain resource allocation for each of the downlink transmissions.

According to some embodiments, the downlink control information scheduling the downlink transmissions from the plurality of TRPs comprises information for determining, for each of the downlink transmissions, one or more of: a modulation and coding scheme (MCS); a redundancy version (RV); or a phase tracking reference signal (PT-RS) configuration.

Yet another set of embodiments may include an apparatus, comprising: a processor configured to cause a wireless device to: receive downlink control information scheduling downlink transmissions from a plurality of transmission reception points (TRPs); and receive downlink transmissions from the plurality of TRPs in accordance with the downlink control information.

According to some embodiments, the processor is further configured to cause the wireless device to: determine physical resource block bundling sizes for the downlink transmissions from the plurality of TRPs using the downlink control information.

According to some embodiments, the processor is further configured to cause the wireless device to: determine a frequency domain resource allocation for each of the downlink transmissions using the downlink control information.

According to some embodiments, the processor is further configured to cause the wireless device to: determine a modulation and coding scheme (MCS) and a redundancy version (RV) for each of the downlink transmissions using the downlink control information.

According to some embodiments, the processor is further configured to cause the wireless device to: determine a phase tracking reference signal (PT-RS) dynamic presence and frequency domain pattern for all of the downlink transmissions based at least in part on a number of resource blocks associated with each of the downlink transmissions.

According to some embodiments, the processor is further configured to cause the wireless device to: determine a phase tracking reference signal (PT-RS) dynamic presence and time domain pattern for all of the downlink transmissions based at least in part on a modulation and coding scheme associated with each of the downlink transmissions.

According to some embodiments, the processor is further configured to cause the wireless device to: determine a phase tracking reference signal (PT-RS) pattern for each of the downlink transmissions separately based at least in part on a number of resource blocks and a modulation and coding scheme associated with each of the downlink transmissions.

According to some embodiments, the processor is further configured to cause the wireless device to: determine a phase tracking reference signal (PT-RS) port associated with each of the downlink transmissions based at least in part on a demodulation reference signal (DMRS) port allocation for each of the downlink transmissions.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio coupled to the at least one antenna; and
   a processor coupled to the at least one radio;
   wherein the antenna, the radio, and the processor are configured to cause the wireless device to:
   receive, from a first transmission reception point (TRP) of a plurality of TRPs, a downlink control information transmission scheduling a plurality of frequency division multiplexed (FDM) downlink transmissions from the plurality of TRPs;
   determine physical resource block bundling sizes separately for the plurality of FDM downlink transmissions from the plurality of TRPs, wherein the determination is based on parameters comprising at least one of:
   whether the plurality of FDM downlink transmissions from the plurality of TRPs are contiguous; or
   whether a number of the plurality of FDM downlink transmissions from the plurality of TRPs exceeds a threshold; and
   receive the plurality of FDM downlink transmissions from the plurality of TRPs in accordance with the downlink control information transmission, wherein the downlink control information includes one indication of a common modulation and coding scheme (MCS) that is applied to the plurality of FDM downlink transmissions and an indication of a redundancy version (RV), wherein respective RVs for the respective FDM downlink transmissions of the plurality of FDM transmissions are determinable in a preconfigured manner from the indication of the RV, wherein a first RV for a first FDM downlink transmission of the plurality of FDM transmissions is different from a second RV for a second FDM downlink transmission of the plurality of FDM transmissions and the second FDM downlink transmission is different from the first FDM downlink transmission.

2. The wireless device of claim 1,
   wherein the downlink control information transmission includes an indication of respective frequency domain resource allocations for the respective FDM downlink transmissions, wherein the antenna, the radio, and the processor are further configured to cause the wireless device to:
   determine the respective frequency domain resource allocations for the respective FDM downlink transmissions based at least in part on the indication of the frequency domain resource allocation for the respective FDM downlink transmissions.

3. The wireless device of claim 1,
   wherein the downlink control information transmission includes a frequency domain resource allocation indicator that configures frequency resources for the plurality of FDM downlink transmissions, wherein the antenna, the radio, and the processor are further configured to cause the wireless device to:
   determine respective frequency domain resource allocation for the respective FDM downlink transmissions based at least in part on the frequency domain resource allocation indicator,
   wherein the frequency domain resource allocation indicator comprises respective combinatorial indices calculated based on respective start resource block index values and respective end resource block index value for the respective FDM downlink transmissions.

4. The wireless device of claim 1,
   wherein the antenna, the radio, and the processor are further configured to cause the wireless device to:
   determine the MCS for respective FDM downlink transmissions based on the one indication of the common MCS.

5. The wireless device of claim 1,
   wherein the antenna, the radio, and the processor are further configured to cause the wireless device to:

determine respective RVs for the respective FDM downlink transmissions based at least in part on the RV.

6. The wireless device of claim 5, wherein the MCS and the RV for a third FDM downlink transmission of the plurality of FDM downlink transmissions is determined further based at least in part on a resource allocation for the third FDM downlink transmission.

7. The wireless device of claim 1, wherein the antenna, the radio, and the processor are further configured to cause the wireless device to: determine respective phase tracking reference signal (PT-RS) dynamic presences and frequency domain patterns for respective FDM downlink transmissions based at least in part on a number of resource blocks associated with the respective FDM downlink transmissions.

8. The wireless device of claim 1, wherein the antenna, the radio, and the processor are further configured to cause the wireless device to: determine respective phase tracking reference signal (PT-RS) dynamic presences and time domain patterns for respective FDM downlink transmissions based at least in part on the MCS.

9. The wireless device of claim 1, wherein the antenna, the radio, and the processor are further configured to cause the wireless device to: determine respective phase tracking reference signal (PT-RS) patterns for respective FDM downlink transmissions separately based at least in part on a number of resource blocks associated with the respective FDM downlink transmissions.

10. A cellular base station, comprising:
at least one antenna;
at least one radio coupled to the at least one antenna; and
a processor coupled to the at least one radio;
wherein the antenna, the radio, and the processor are configured to cause the cellular base station to:
provide, from a first transmission reception point (TRP) of a plurality of TRPs, downlink control information scheduling a plurality of frequency division multiplexed (FDM) downlink transmissions from the plurality of TRPs to a wireless device;
determine physical resource block bundling sizes separately for the plurality of FDM downlink transmissions from the plurality of TRPs, wherein the determination is based on parameters comprising at least one of:
whether the plurality of FDM downlink transmissions from the plurality of TRPs are contiguous; or
whether a number of the plurality of FDM downlink transmissions from the plurality of TRPs exceeds a threshold; and
provide, from the first TRP, at least one frequency division multiplexed (FDM) downlink transmission of the plurality of FDM downlink transmissions to the wireless device in accordance with the downlink control information, wherein the downlink control information includes one indication of a common modulation and coding scheme (MCS) that is applied to the plurality of FDM downlink transmissions and one indication of a redundancy version (RV), wherein respective RVs for the respective FDM downlink transmissions of the plurality of FDM transmissions are determinable in a preconfigured manner from the indication of the RV, wherein a first RV for a first FDM downlink transmission of the plurality of FDM transmissions is different from a second RV for a second FDM downlink transmission of the plurality of FDM transmissions and the second FDM downlink transmission is different from the first FDM downlink transmission.

11. The cellular base station of claim 10, wherein the downlink control information scheduling the plurality of FDM downlink transmissions from the plurality of TRPs comprises information for the determining physical resource block bundling sizes for the plurality of FDM downlink transmissions.

12. The cellular base station of claim 10, wherein the downlink control information scheduling the plurality of FDM downlink transmissions from the plurality of TRPs comprises information for determining a frequency domain resource allocation for the respective FDM downlink transmissions.

13. The cellular base station of claim 10, wherein the downlink control information scheduling the plurality of FDM downlink transmissions from the plurality of TRPs comprises information for determining, for the respective FDM downlink transmissions, a phase tracking reference signal (PT-RS) configuration.

14. An apparatus, comprising:
a processor configured to cause a wireless device to:
receive, from a first transmission reception point (TRP) of a plurality of TRPs, a downlink control information transmission scheduling a plurality of frequency division multiplexed (FDM) downlink transmissions from the plurality of TRPs;
determine physical resource block bundling sizes separately for the plurality of FDM downlink transmissions from the plurality of TRPs, wherein the determination is based on parameters comprising at least one of:
whether the plurality of FDM downlink transmissions from the plurality of TRPs are contiguous; or
whether a number of the plurality of FDM downlink transmissions from the plurality of TRPs exceeds a threshold; and
receive the plurality of FDM downlink transmissions from the plurality of TRPs in accordance with the downlink control information transmission, wherein the downlink control information includes one indication of a common modulation and coding scheme (MCS) that is applied to the plurality of FDM downlink transmissions and one indication of a redundancy version (RV), wherein respective RVs for the respective FDM downlink transmissions of the plurality of FDM transmissions are determinable in a preconfigured manner from the indication of the RV, wherein a first RV for a first FDM downlink transmission of the plurality of FDM transmissions is different from a second RV for a second FDM downlink transmission of the plurality of FDM transmissions and the second FDM downlink transmission is different from the first FDM downlink transmission.

15. The apparatus of claim 14, wherein the processor is further configured to cause the wireless device to:
determine respective frequency domain resource allocations for respective FDM downlink transmissions using the downlink control information.

16. The apparatus of claim 14, wherein the processor is further configured to cause the wireless device to:
determine respective phase tracking reference signal (PT-RS) dynamic presences and frequency domain patterns for respective FDM downlink transmissions based at least in part on a number of resource blocks associated with the respective FDM downlink transmissions.

17. The apparatus of claim 14, wherein the processor is further configured to cause the wireless device to:
determine respective phase tracking reference signal (PT-RS) dynamic presences and time domain patterns for respective FDM downlink transmissions based at least in part on the MCS.

18. The apparatus of claim 14, wherein the processor is further configured to cause the wireless device to:
determine respective phase tracking reference signal (PT-RS) patterns for respective FDM downlink transmissions separately based at least in part on a number of resource blocks associated with the respective FDM downlink transmissions.

19. The apparatus of claim 14, wherein the processor is further configured to cause the wireless device to:
determine respective phase tracking reference signal (PT-RS) ports associated with respective FDM downlink transmissions based at least in part on a demodulation reference signal (DMRS) port allocation for the respective FDM downlink transmissions.

20. The apparatus of claim 14, wherein the processor is further configured to cause the wireless device to:
determine the MCS and the RV for a third FDM downlink transmission of the plurality of FDM downlink transmissions further based at least in part on a resource allocation for the third FDM downlink transmission.

\* \* \* \* \*